United States Patent [19]

Middleton

[11] Patent Number: 4,542,843
[45] Date of Patent: Sep. 24, 1985

[54] METHOD OF FRICTION WELDING A LAMP FEEDTHROUGH ASSEMBLY

[75] Inventor: Thomas R. Middleton, Peabody, Mass.

[73] Assignee: GTE Laboratories Incorporated, Waltham, Mass.

[21] Appl. No.: 604,564

[22] Filed: Apr. 27, 1984

[51] Int. Cl.[4] .......................... B23K 20/12; H01J 9/18
[52] U.S. Cl. ........................................ 228/112; 445/35
[58] Field of Search ...................... 228/112, 113, 114; 156/73.5; 445/26, 29, 35

[56] References Cited

U.S. PATENT DOCUMENTS

| | | | |
|---|---|---|---|
| 2,933,428 | 4/1960 | Mueller | 156/73.5 |
| 3,444,611 | 5/1969 | Bogart | 228/112 |
| 4,129,241 | 12/1978 | Devine | 228/113 X |
| 4,160,186 | 7/1979 | Kerekes | 313/623 |
| 4,334,628 | 6/1982 | Buhrer et al. | 220/2.1 R |

*Primary Examiner*—Kenneth J. Ramsey
*Attorney, Agent, or Firm*—Joseph S. Romanow

[57] ABSTRACT

This invention provides a method of welding an electric feedthrough assembly for an electric lamp. The feedthrough assembly comprises at least a plug and an electrode pin, each being formed from an electrically conductive refractory material, such as a molybdenum-titanium-nickel plug and a tungsten electrode pin. In a preferred embodiment of the invention, the electrode pin is inserted into a chuck of a drill press. The plug is placed on a rubber pad with the cavity in the plug aligned under the electrode pin. The electrode pin is rotated and pressed into the cavity with increasing pressure until the plug commences rotating on the rubber pad. Substantial heat is generated within the cavity by friction between the rotating electrode pin and the stationary surface of the plug within the cavity. As the pressure is increased on the electrode pin, intimate contact between the materials is attained. The materials melt at the surfaces where friction occurs; the coefficient of friction in fluid decreases; production of heat ceases; the molten materials cool and fuse together whereupon the plug commences rotating. The rubber pad inhibits rotation of the plug only when the torque on the plug is less than a threshold value, i.e., prior to fusion of the plug and electrode pin.

5 Claims, 4 Drawing Figures

METHOD OF FRICTION WELDING A LAMP FEEDTHROUGH ASSEMBLY

CROSS REFERENCES TO RELATED APPLICATIONS

Copending U.S. application, entitled *Mo-Ti Members with Non-metallic Sintering Aids*, by Ditchek et al, filed Jan. 9, 1984, having Ser. No. 568,995, contains related subject matter. Copending U.S. patent application Ser. No. 604,562, entitled *Method of Welding a Lamp Feedthrough Assembly; and Apparatus Therefor*, by Feuersanger et al, filed concurrently herewith, contains related subject matter.

TECHNICAL FIELD

This invention relates to the field of electric lamp components and more particularly to welding methods for the fabrication of electric feedthrough assemblies for such lamps.

BACKGROUND OF THE INVENTION

In U.S. Pat. No. 4,334,628, by Buhrer et al, and U.S. Pat. No. 4,366,410, by Buhrer, both patents being incorporated herein by reference, there is disclosed a vacuum-tight assembly, such as a discharge tube for a metal vapor discharge lamp. The vacuum-tight assembly comprises a high-density polycrystalline ceramic body, such as alumina or yttria, having a cavity, at least one closure member, and a sealing material for hermetically sealing the cavity. The materials for the closure member and sealing material have thermal coefficients of expansion closely matched to the thermal coefficient of expansion of the ceramic body over a wide temperature range thereby facilitating fabrication of the vacuum-tight assembly by sintering. Certain metals and alloys are well suited for the closure member, e.g., molybdenum, or mixtures thereof. These refractory metals are especially difficult to weld. The closure member will hereinafter be referred to as an electric feedthrough assembly or simply as a feedthrough.

Various methods of fabricating electric feedthrough assemblies are known. The Buhrer et al patent teaches bonding of the electrode pin and the lead-in pin into holes in opposite sides of the body of the feedthrough by means of sintering or certain welding techniques which are not suitable for presently preferred refractory metals. The Buhrer patent teaches welding in an inert gas by an electric arc or laser welding.

In production, separate attachment of the tungsten electrode to the feedthrough is preferred over sintering-in of the electrode pin. Separate attachment allows a smaller part inventory for a particular feedthrough size. Separate attachment also permits easy adjustment of the desired backspacing for specific lamps.

In the existing art, separate attachment of the tungsten electrode to a niobium metal feedthrough is accomplished by tungsten-inert-gas (TIG) welding producing a brittle tungsten-niobium alloy. With the high temperatures experienced during TIG welding, extensive regions of the feedthrough are heated to the molten state and recrystallized during cooling. This also occurs in TIG welding of molybdenum metal feedthroughs. Extensive recrystallization produces larger grain size which often results in a brittle weld. Also, the recrystallized feedthrough body is prone to crack due to internal forces caused by temperature extremes experienced during lamp warm up, operation, and cool down.

Where a titanium and molybdenum alloy is involved, oxidation is a persistent problem despite the inert gas environment; it is believed that oxygen may be released from the materials themselves which reacts with the alloy resulting in a weak mechanical connection with high electrical resistance. If the coil is attached to the electrode, an electron-emissive coating on the coil may be damaged by the welding process.

With laser welding carried out on molybdenum-titanium-nickel alloys, the joint to be welded is rotated under the beam of a pulsed YAG laser at 1.06 micrometers whereby considerable energy (and therefore heat) is absorbed by the joint. As a result, the same problems are experienced with laser welding as are experienced with TIG welding. Another disadvantage of laser welding is the high cost of the welding equipment.

While TIG and laser welding for niobium metal is being successfully employed in the lamp-making field today, it would be an advancement of the art if a novel welding technique were provided which avoids the difficulties and problems discussed above particularly if the new technique is economically feasible for manufacturing processes.

DISCLOSURE OF THE INVENTION

It is, therefore, an object of the invention to obviate the deficiencies in the prior art.

It is another object of the invention to provide a method of welding electric feedthrough assemblies for electric lamps wherein the feedthrough assemblies comprise electrically conductive refractory materials.

Still another object of the invention is to provide a method for welding refractory metals.

A further object of the invention is to provide method of fabricating electric feedthrough assemblies for electric lamps which is easier and less costly to implement in a production environment than that of the existing art.

These objects are accomplished, in one aspect of the invention, by provision of a novel method of welding an electric feedthrough assembly for an electric lamp. The feedthrough assembly comprises at least two components. Each of the two components is formed from an electrically conductive refractory material. One of these components is a plug; the other of these components is an electrode pin. The plug and electrode pin have a coefficient of friction between them. The plug has a body with a cavity formed therein for receiving the electrode pin. The electrode pin has a longitudinal axis. The cavity has a longitudinal axis. The plug has a longitudinal axis which is defined to be identical to the longitudinal axis of the cavity. The method comprises the following steps.

Rotation-resisting means are applied to the first of these components. The rotation-resisting means are effective to inhibit rotation of the first component only when the torque exerted on the first component is less than a threshold value.

The second of these components is rotated about its longitudinal axis.

The electrode pin is caused to make contact with the surface of said plug within the cavity such that a torque is exerted on the first component by the rotating second component, the torque having a value less than the threshold value, whereby heat from friction is generated within the cavity at the interface between the rotating second component and the stationary first component.

Increasing pressure is applied on at least one of these components such that intimate contact is attained between the electrode pin and the surface of the plug within the cavity. This pressure is increased until the torque exceeds the threshold value and the first component commences rotating, whereby a permanent bond has been formed between the electrode pin and the plug.

BEST MODE FOR CARRYING OUT THE INVENTION

For a better understanding of the present invention, together with other and further objects, advantages, and capabilities thereof, reference is made to the following disclosure and appended claims taken in conjunction with the above-described drawings.

Figure 1:
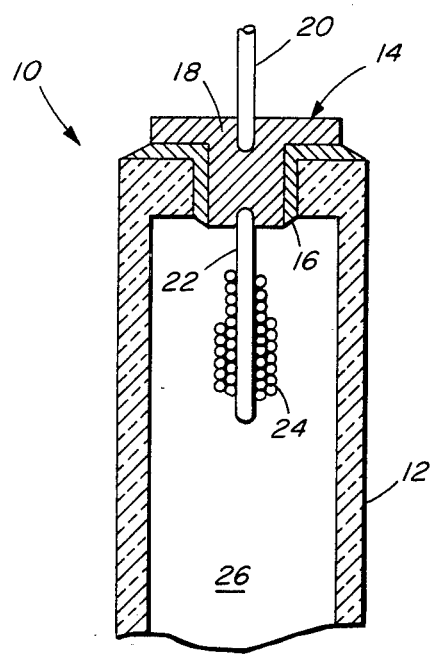
FIG. 1 is a sectional view of one end of a discharge tube of an electric lamp employing a feedthrough assembly which may be manufactured by the welding process disclosed herein.

FIG. 1 shows one end 10 of a vacuum-tight assembly, such as a discharge tube for an electric lamp, comprising hermetically sealed body 12, electric feedthrough assembly 14, and sealing material 16. Feedthrough 14 comprises plug 18, lead-in pin 20, and electrode pin 22. Radiator coil 24 is mounted on electrode pin 22 near the end of electrode pin 22 pointing toward interior 26 of body 12. Lead-in pin 20, plug 18, and electrode pin 22 each are formed from an electrically conductive refractory material. In the fabrication of feedthrough assembly 14 employing the welding method disclosed herein, radiator coil 24 is mounted on electrode pin 22, e.g., by crimping, after the welding of electrode pin 22 to plug 18 has been completed. In the following, the welding of electrode pin 22 to plug 18 will be described. The welding of lead-in pin 20 to plug 18 may be performed by the identical welding method.

Figure 2:
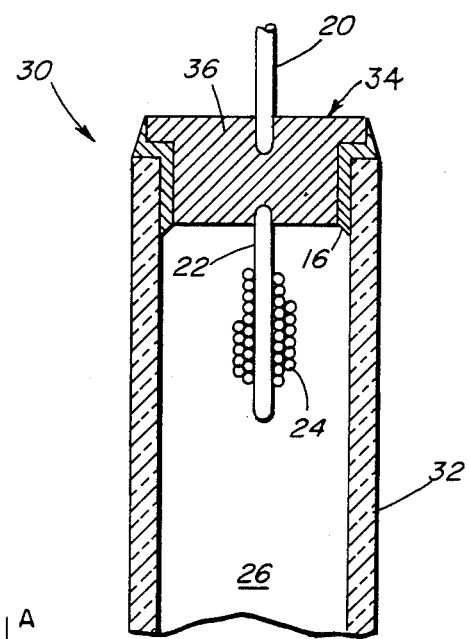
FIG. 2 is a sectional view of one end of an alternate design of a discharge tube for an electric lamp employing a feedthrough assembly which may be manufactured by the welding process disclosed herein.

FIG. 2 shows one end 30 of an alternate design of a discharge tube for an electric lamp wherein body 32 is straight-walled. Feedthrough 34, particularly plug 36, is shaped to conform with the straight cylindrical shape of body 32. The slight variance in shape between plug 14 of discharge tube 10 and plug 34 of discharge tube 30 is immaterial to the welding method described herein. For convenience, discharge tube 10 will be referred to in the following.

Figure 3:
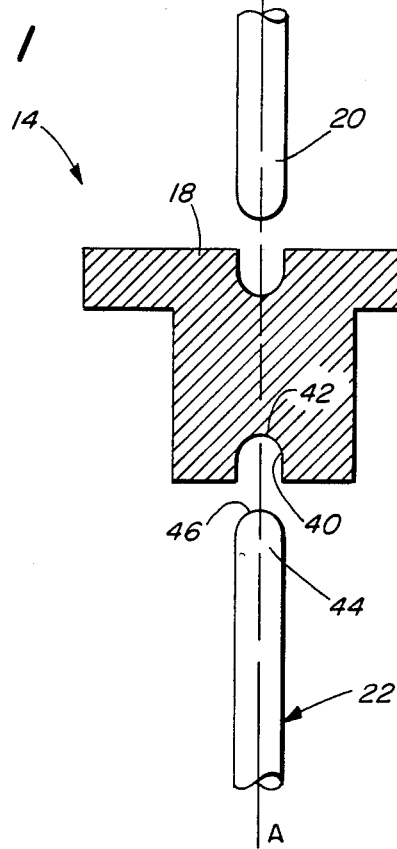
FIG. 3 is an enlarged exploded sectional view of an electric feedthrough assembly shown in either FIG. 1 or FIG. 2.

FIG. 3 shows an enlarged and exploded view of feedthrough 14 prior to assembly. Longitudinal axis A—A serves as central axis for plug 18, electrode pin 22, and lead-in pin 20. Plug 18 has cavity 40 formed therein which is shaped to receive end 44 of electrode pin 22. It is desirable that cavity 40 and end 44 be shaped to conform with each other so that intimate contact may readily be attained between the surface of end 44 and the surface within cavity 40 when an appropriate force or pressure is applied. As used herein, intimate contact means that the atoms at the interface between the two surfaces are no farther apart than the atoms within the materials. In this embodiment, cavity 40 comprises a cylindrical bore with an approximately hemispherical top 42. End 44 comprises a cylinder having a cross-sectional diameter slightly less than the diameter of the circular opening of cavity 40. End 44 has an approximately hemispherical top 46.

Figure 4:
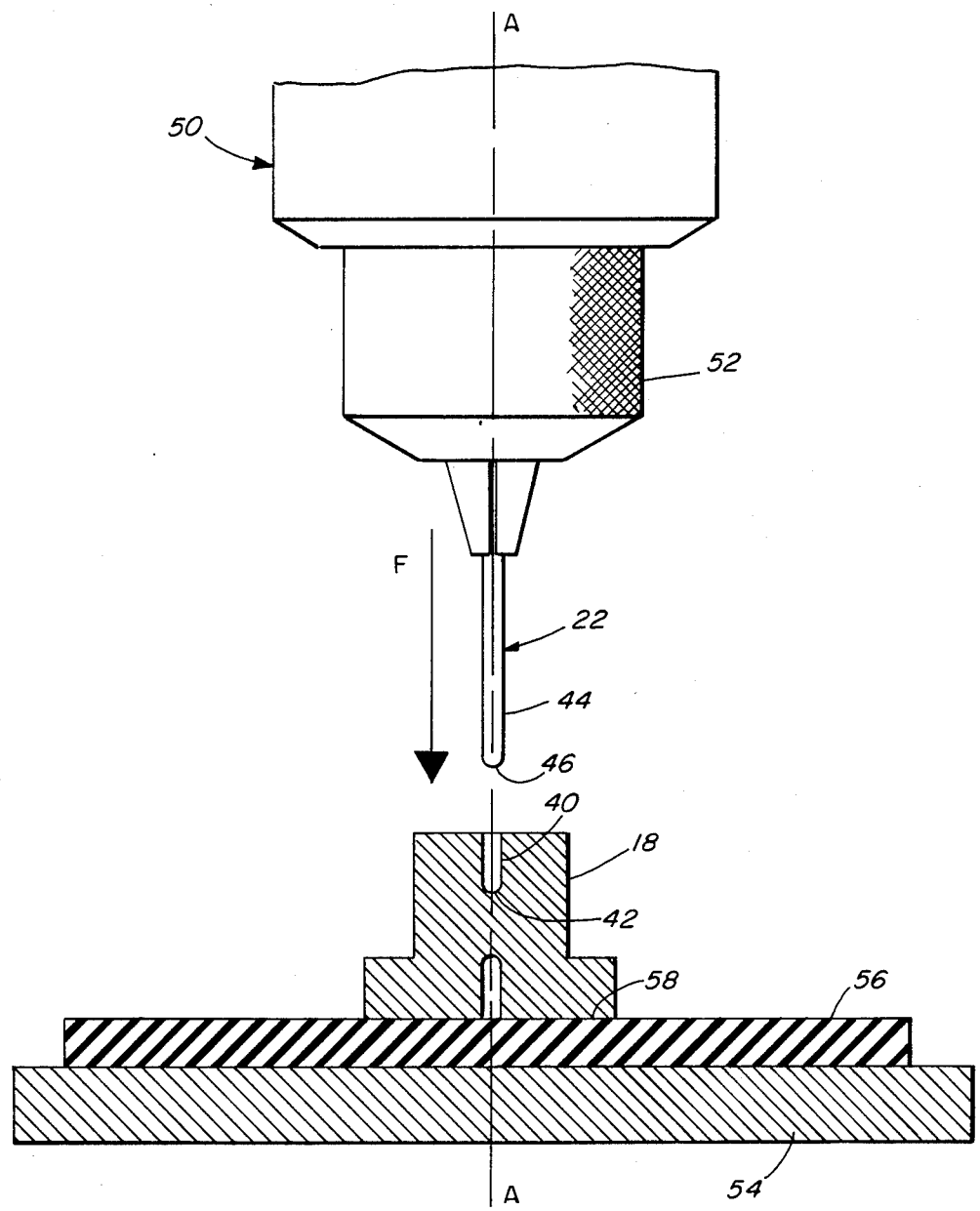
FIG. 4 is an elevational view of a drill press having a sectional view of the components of a feedthrough assembly; this drawing illustrates an embodiment of the welding process disclosed herein.

In FIG. 4, there is shown a drill press 50 comprising chuck 52 and platform 54. Electrode pin 22 is tightly gripped by chuck 52. Plug 18 is placed on pad 56 which rests on adjustable platform 54. Plug 18 is positioned so that cavity 40 will receive end 44 when electrode pin 22 is moved in the direction of arrow F.

Drill press 50 provides means for rotating electrode pin 22 about longitudinal axis A—A; inserting rotating end 44 into cavity 40 and causing end 44 to make contact with the surface of plug 18 within cavity 40; and applying force or pressure on electrode pin 22 and therethrough on plug 18 in the direction of arrow F such that end 44 of rotating electrode pin 22 makes intimate contact with the surface of plug 18 within cavity 40. Pad 56, which has a substantial rubber content, provides rotation-resisting means for plug 18. When a torque is exerted on plug 18 as a result of rotating electrode pin 22 making contact with the surface of plug 18 within cavity 40, the resistance to rotation caused by frictional forces at interface 58 of plug 18 and rubber pad 56 prevents rotation of plug 18 until the torque exceeds the threshold value. The threshold value of the rotation-resisting forces depend on the nature of the materials comprising interface 58 and the force or pressure exerted by chuck 52 on plug 18 along arrow F. Platform 54 of drill press 50 provides a stable base for the welding procedure.

It is believed that the weld is achieved as a result of the following events which occur in the welding process. As the rotating electrode pin comes in contact with the surface of the plug within the cavity, substantial heat is generated because of friction between the rotating and stationary surfaces within the cavity. As pressure is increased, intimate contact between these surfaces is attained. The surfaces begin to melt. When these surfaces reach the fluid state, the coefficient of friction between them is greatly reduced whereupon the generation of heat ceases and the molten surfaces begin to cool. When solidification occurs, the rotating electrode pin and the plug are fused into a single body. At the instant of fusion, the torque exerted on the plug by the rotating electrode pin increases well beyond the threshold value of the torque-resisting means and the plug commences rotating. These events may occur in as little as one or several seconds.

The threshold value of the rotation-resisting means must be high enough to restrain rotation of the plug until fusion occurs. At the instant of fusion, the threshold value should be readily exceeded in order to avoid strain or damage to the weld or components of the feedthrough assembly. At the instant of fusion in the embodiment described, the torque exerted on the electrode pin by the drill chuck is transmitted directly to the plug and the frictional forces resisting rotation of the plug are immediately exceeded. Experience has shown that a pad having a substantial rubber content in conjunction with a molybdenum-alloy plug provides sufficient frictional resistance, even under pressures required for intimate contact of the materials, to keep the plug stationary so that adequate heat is generated to cause fusion of the components. The drill press provides means for applying increasing pressure which may be controlled manually or automatically.

In the embodiment described, heat necessary to effectuate the weld is generated within the cavity by friction resulting from a rotating electrode pin against a stationary plug. The result would be the same if the plug were rotating and the electrode pin were held stationary. Other embodiments of invention may employ a rotating plug and stationary electrode pin with rotation-resisting means applied to the electrode pin.

In the embodiment described, the rotation-resisting means comprises a pad having a substantial rubber content. This simple device is easy to use in practice and effective. Once the pad is positioned on the platform, a marking or slight indentation in the pad for receiving the plug is helpful in aligning the plug's cavity with respect to the electrode pin and drill chuck. Another feature of the pad is that it may be easily adapted to automated techniques. Other embodiments of the invention may use different rotation-resisting means. For example, a clamp or vice, preferably with variable gripping means, may be employed. The tightness or tension of the clamp or vice must be adjusted so that the threshold value of the rotation-resistance means meets the requirements stated above.

In the embodiments of the invention discussed, the rotation-resisting means has been limited to inhibiting rotation prior to fusion of the feedthrough components and the rotation means has been absolute. In principle, the rotation means may be limited so as to cause rotation only prior to fusion of the components and the rotation-inhibiting means may be absolute. The objective is to have the relative motion between the components cease at the instant of fusion. In practice, the pre-fusion limitation on the rotation-inhibiting means appears to be more feasible.

It is desirable to have a tight fit between the electrode pin and the cavity of the plug. When the fit is tight, friction occurs at all or most of the surface area within the cavity which results in fusion occurring at all or most of the surface area within the cavity. If the fit is not tight enough for friction to occur on the lateral surfaces of the cavity, acceptable welds nevertheless may be obtained. In the latter case, fusion between the materials will occur in the vicinity of the base of the cavity, i.e., that portion of the surface of the cavity which contacts the end of the electrode pin during the press portion of the welding process.

Laboratory examples of feedthrough assemblies welded by the process disclosed herein show that only a small portion of the plug, in the vicinity of the cavity, is heated to the molten state. Extensive recrystallization and the resultant brittleness of the plug, which are characteristic of TIG and laser welding of refractory materials, do not occur. The laboratory examples have welds that exhibit equivalent or superior characteristics compared with welds of the same components and materials made with techniques of the existing art.

Feedthrough assemblies welded in the laboratory comprised molybdenum-titanium-nickel plugs, being 74%-25%-1%, respectively, by weight, having opposed cylindrical cavities each with a cross-sectional diameter ranging from approximately 0.047-0.050 inches (1.19 to 1.27 millimeters); a tungsten electrode pin having a cross-sectional diameter of approximately 0.047 inches (1.19 millimeters); and a molybdenum lead-in pin, having a cross-sectional diameter of approximately 0.047 inches (1.19 millimeters). The chuck of the drill press was rotated at approximately 500 revolutions per minute. The rotating electrode pin or lead-in pin was pressed into the plug cavity by gradually increasing the pressure manually until the plug commenced rotating on the rubber pad. In order to accommodate welding of the lead-in pin subsequent to the weld of the electrode pin, a hole may be formed in the rubber pad into which the electrode pin may be inserted during the weld of the lead-in pin.

While there have been shown what are at present considered to be preferred embodiments of the invention, it will be apparent to those skilled in the art that various changes and modifications can be made herein without departing from the scope of the invention as defined by the appended claims.

I claim:

1. A method of welding an electric feedthrough assembly for an electric lamp, said feedthrough assembly comprising at least two components, each of said two components being formed from an electrically conductive refractory material, one of said components being a plug, the other of said components being an electrode pin, said plug and said electrode pin having a coefficient of friction between them, said plug having a body with a cavity formed therein for receiving said electrode pin, said electrode pin having a longitudinal axis, said cavity having a longitudinal axis, said plug having a longitudinal axis which is defined to be identical to said longitudinal axis of said cavity, said method comprising the steps of:
   (a) applying rotation-resisting means to the first of said components, said rotation-resisting means being effective to inhibit rotation of said first component only when the torque exerted on said first component is less than a threshold value;
   (b) rotating the second of said components about its longitudinal axis;
   (c) causing said electrode pin to make contact with the surface of said plug within said cavity such that a torque is exerted on said first component by said rotating second component, said torque having a value less than said threshold value, whereby heat from friction is generated within said cavity at the interface between said rotating second component and said stationary first component; and
   (d) applying increasing pressure on at least one of said components such that intimate contact is attained between said electrode pin and the surface of said plug within said cavity, said pressure being increased until said torque exceeds said threshold value and said first component commences rotating, whereby a permanent bond has been formed between said electrode pin and said plug.

2. A method as described in claim 1 wherein said first component is said plug and said second component is said electrode pin.

3. A method as described in claim 2 wherein said plug is formed from an alloy comprising molybdenum, titanium, and a material selected from the group consisting of nickel, cobalt, copper, and mixtures thereof; and said wire pin comprises a material selected from the group consisting of tungsten and molybdenum.

4. A method as described in claim 3 wherein said electrode pin has two ends, said torque-resisting means comprises a pad having a substantial rubber content, said plug rests on said pad during said welding method, one end of said electrode pin is secured in a chuck of a drill press, said chuck and said electrode pin are rotated at approximately 500 revolutions per minute, and the other end of said rotating electrode pin is pressed against the surface of said plug within said cavity with increasing pressure until said plug commences rotating.

5. A method as described in claim 3 wherein said rotation-resisting means is a clamp having adjustable gripping means.

* * * * *